(12) United States Patent
Ledoux et al.

(10) Patent No.: US 6,372,193 B1
(45) Date of Patent: *Apr. 16, 2002

(54) PROCESS FOR OXIDIZING THE $H_2S$ CONTAINED AT LOW CONCENTRATION IN A GAS DIRECTLY TO SULPHUR BY CATALYTIC MEANS AND IN THE VAPOUR PAUSE

(75) Inventors: Marc Ledoux; Jean Nougayrede, both of Strasbourg; Cuong Pham-Huu, Saverne; Nicolas Keller, Strasbourg; Sabine Savin-Poncet, Buros; Claude Crouzet, Strasbourg, all of (FR)

(73) Assignee: Elf Exploration Production (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/578,148

(22) Filed: May 24, 2000

Related U.S. Application Data

(63) Continuation of application No. PCT/FR99/02237, filed on Sep. 21, 1999.

(30) Foreign Application Priority Data

Sep. 24, 1998 (FR) .............................................. 98 11941

(51) Int. Cl.$^7$ ............................................... C01B 17/04
(52) U.S. Cl. ............................... 423/573.1; 423/576.8; 502/305; 502/325; 502/345; 502/514
(58) Field of Search .......................... 423/573.1, 576.8; 502/305, 325, 345, 514

(56) References Cited

U.S. PATENT DOCUMENTS

| | | | | |
|---|---|---|---|---|
| 4,310,497 A | * | 1/1982 | Deschamps et al. | 423/230 |
| 4,311,683 A | * | 1/1982 | Hass et al. | 423/573 G |
| 6,083,471 A | * | 7/2000 | Philippe et al. | 423/573.1 |
| 6,235,259 B1 | * | 5/2001 | Ledoux et al. | 423/573.1 |

FOREIGN PATENT DOCUMENTS

| | | | |
|---|---|---|---|
| DE | 129 037 A | * | 12/1977 |
| EP | 0078 690 A2 | | 5/1983 |
| EP | 0 134 593 A1 | * | 3/1985 |
| EP | 0140 045 A2 | | 5/1985 |
| EP | 0313 480 A1 | | 4/1989 |
| EP | 0440 569 A2 | | 8/1991 |
| EP | 0511 919 A1 | | 4/1992 |
| EP | 0543 751 A1 | | 5/1993 |
| EP | 0543 752 A1 | | 5/1993 |
| FR | 2511 663 | | 2/1983 |
| FR | 2540 092 A | | 8/1984 |
| FR | 2 727 101 A1 | * | 5/1996 |
| FR | 2758 279 A1 | | 7/1998 |
| GB | 1 307 716 | * | 2/1973 |
| WO | WO 83/02068 A | | 6/1983 |
| WO | WO 97/19019 A | | 5/1997 |
| WO | WO 99/33748 | * | 7/1999 |

* cited by examiner

*Primary Examiner*—Steven P. Griffin
*Assistant Examiner*—Timothy C Vanoy
(74) *Attorney, Agent, or Firm*—Schnader Harrison Segal & Lewis LLP

(57) ABSTRACT

A process for catalytically oxidizing $H_2S$ contained in a gas directly to sulphur containing the following steps: combining the $H_2S$-containing gas with a gas containing free oxygen in an amount to produce an oxygen-enriched $H_2S$-containing gas having $O_2/H_2S$ molar ratio ranging from about 0.05 to about 15; and contacting the oxygen-enriched $H_2S$-containing gas with a catalyst for selective oxidation of $H_2S$ to sulphur, wherein the catalyst includes a catalytically active phase combined with a silicon carbide-based support and wherein the active phase of the catalyst consists of at least one oxysulphide of at least one metal selected from the group consisting of iron, copper, nickel, cobalt, chromium, molybdenum and tungsten, at a temperature above the dew point of sulphur formed during $H_2S$ oxidation.

23 Claims, No Drawings

PROCESS FOR OXIDIZING THE H₂S CONTAINED AT LOW CONCENTRATION IN A GAS DIRECTLY TO SULPHUR BY CATALYTIC MEANS AND IN THE VAPOUR PAUSE

RELATED APPLICATION

This is a continuation of International Application No. PCT/FR99/02237, with an international filing date of Sep. 21, 1999, which is based on French Patent Application No. 98/11941, filed Sep. 24, 1998.

FIELD OF THE INVENTION

This invention relates to a process for oxidizing $H_2S$ contained at low concentration in a gas directly to sulphur by catalytic means in the vapour phase.

BACKGROUND

In order to recover $H_2S$ contained at low concentration, namely a concentration of less than 25% by volume and, more particularly, between 0.001% and 20% and most especially ranging from 0.005% to 10% by volume in gases from various sources, use may especially be made of processes involving a direct catalytic oxidation of $H_2S$ to sulphur according to the reaction:

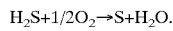

$$H_2S + 1/2 O_2 \rightarrow S + H_2O.$$

In such processes, the $H_2S$-containing gas to be treated, mixed with a suitable amount of gas containing free oxygen, for example, air, oxygen or oxygen-enriched air, is brought into contact with a catalyst for oxidizing $H_2S$ to sulphur by carrying out this contact at temperatures either above the dew point of the sulphur formed, in which case the sulphur formed is present in the vapour state in the reaction medium coming from the reaction, or at temperatures below the dew point of the sulphur formed, in which case the sulphur is deposited on the catalyst, thereby requiring the sulphur-laden catalyst to be periodically regenerated by vaporizing the sulphur by flushing with a non-oxidizing gas having a temperature of between 200° C. and 500° 0C.

In particular, the oxidation of $H_2S$ to sulphur at temperatures above the dew point of sulphur, that is to say, at temperatures greater than approximately 180° C., may be carried out in contact with a catalyst consisting of titanium oxide (EP-A-0,078,690), titanium oxide containing an alkaline-earth metal sulphate (WO-A-8302068), titanium oxide containing nickel oxide and optionally aluminium oxide (EP-A-0,140,045), an oxide of the titanium oxide or zirconium oxide or silica type, combined with one or more compounds of transition metals chosen from Fe, Cu, Zn, Cd, Cr, Mo, W, Co and Ni, preferably Fe, and optionally with one or more compounds of precious metals chosen from Pd, Pt, Ir and Rh, preferably Pd (FR-A-2,511,663) or else a thermally stabilized alumina combined with one or more compounds of transition metals, such as those mentioned above, especially Fe, and, optionally, with one or more compounds of precious metals chosen from Pd, Pt, Ir and Rh (FR-A-2,540,092).

The catalysts as mentioned above, consisting of a catalytic phase based on at least one oxide, salt or sulphide of a transition metal and combined with a support consisting of at least one material chosen from alumina, titanium oxide, zirconium oxide, silica, zeolites, silica/alumina mixtures, silica/titanium oxide mixtures and active carbon, which are used for the catalytic oxidation of $H_2S$ to sulphur, still have certain inadequacies in prolonged use. In particular, the catalysts which have an alumina-based support are susceptible to changing over time by sulphurization. With regard to the catalysts whose support consists of active carbon, precautions must be taken during their use to prevent oxidation of the support, which is accompanied by a loss of the support. In addition, for these various catalysts, the catalytic phase impregnating the support has a tendency to migrate into the interstices of the support and, thereby, makes it difficult, or indeed often impossible, to recover the metal from the catalytic phase in the spent catalyst. Finally, the abovementioned catalysts have a mediocre thermal conductivity, which means that the temperature within the catalytic beds containing them cannot be effectively controlled by heat exchange with a coolant.

To remedy the drawbacks of the catalysts of the above mentioned type, which are used in processes for the direct catalytic oxidation of $H_2S$ to sulphur, carried out in the vapour phase, that is to say at temperatures above the dew point of the sulphur formed and, thus, to obtain a process resulting in an improved sulphur selectivity that continues lastingly over time, the Applicant in FR-A-2,727,101 and WO-A-97/19019 has proposed to carry out the oxidation in contact with a catalyst formed from a silicon carbide support combined with a catalytically active phase containing at least one transition metal, especially Ni, Co, Fe, Cu, Ag, Mn, Mo, Cr, Ti, W and V, in the oxide or salt form and/or in the elemental state.

SUMMARY OF THE INVENTION

A process for catalytically oxidizing $H_2S$ contained in a gas directly to sulphur containing the following steps:

combining the $H_2S$-containing gas with a gas containing free oxygen in an amount to produce an oxygen-enriched $H_2S$-containing gas having $O_2/H_2S$ molar ratio ranging from about 0.05 to about 15; and contacting the oxygen-enriched $H_2S$-containing gas with a catalyst for selective oxidation of $H_2S$ to sulphur, wherein the catalyst includes a catalytically active phase combined with a silicon carbide-based support and wherein the active phase of the catalyst consists of at least one oxysulphide of at least one metal selected from the group consisting of iron, copper, nickel, cobalt, chromium, molybdenum and tungsten, at a temperature above the dew point of sulphur formed during $H_2S$ oxidation.

DETAILED DESCRIPTION OF THE INVENTION

The Applicants have found that the desulphurizing activity and sulphur selectivity of the catalyst with a silicon carbide support in the process for direct oxidation of $H_2S$ to sulphur, carried out at temperatures above the dew point of the sulphur formed, can further be improved by carrying out the oxidation using an active phase of the catalyst, which consists of one or more oxysulphides of selected transition metals.

The subject of the invention includes, therefore, a process for oxidizing $H_2S$ contained at low concentration in a gas directly to sulphur by catalytic means, which process is of the type in which the $H_2S$-containing gas with a gas containing free oxygen, in a suitable amount to give an $O_2/H_2S$ molar ratio ranging from about 0.05 to about 15, is brought into contact with a catalyst for the selective oxidation of $H_2S$ to sulphur, which includes a catalytically active phase combined with a silicon carbide-based support and formed from at least one compound of at least one transition metal, the process being carried out at temperatures above the dew point of the sulphur formed during the $H_2S$ oxidation, and it is characterized in that the active phase of the catalyst consists of at least one oxysulphide of at least one metal chosen from iron, copper, nickel, cobalt, chromium, molybdenum and tungsten.

Advantageously, the metal constituting, in the oxysulphide form, the active phase of the oxidation catalyst is iron or a mixture of iron and of at least one of the metals copper, nickel, cobalt, chromium, molybdenum and tungsten. The mixture preferably is mostly iron.

As indicated above, the $H_2S$-to-sulphur oxidation reaction is carried out at temperatures above the dew point of the sulphur produced and, more particularly, at temperatures above about 180° C. and possibly going up to about 500° C. Preferably, the $H_2S$-to-sulphur oxidation reaction is carried out at temperatures of between about 190° C. and about 300° C. and more especially between about 200° C. and about 260° C.

The active phase of the oxidation catalyst, measured by weight of metal, usually represents from about 0.1 to about 20%, more particularly from 0.2% to 15% and more especially from about 0.2% to about 7% of the weight of the catalyst.

The silicon carbide support advantageously forms at least about 40% and, more particularly, at least about 50% of the weight of the oxidation catalyst.

The specific surface area of the $H_2S$-to-sulphur oxidation catalyst may vary quite widely depending on the conditions under which the oxidation process is carried out. Advantageously, the specific surface area, determined by the BET nitrogen absorption method at the temperature of liquid nitrogen (NF X 11-621 standard), may range from about 0.05 $m^2/g$ to about 600 $m^2/g$ and more particularly from about 0.1 $m^2/g$ to about 400 $m^2/g$.

The oxidation catalyst with a silicon carbide support and oxysulphide active phase may be prepared, for example, by carrying out the following. In a first step, an oxidized precursor of the catalyst is prepared by first impregnating a silicon carbide support, which is in the form of a powder, pellets, granules, extrudates or other forms of agglomerates, by means of a solution or of a sol, in a solvent such as water, of the metal or metals desired for the active phase, in the form of salts, and then by drying the support thus impregnated and by calcining the dried product at temperatures that may range from about 250° C. to about 500° C., which calcining may or may not be carried out in an inert atmosphere.

In a second step, a sulphurized precursor of the catalyst is formed by subjecting the oxidized precursor from the first step to a sulphurization treatment by bringing it into contact with a sulphurizing agent consisting of elemental sulphur and/or of a gas mixture consisting of $H_2S$ and of an inert gas, which treatment is carried out at temperatures of between about 250° C. and about 500° C. and for a time long enough to achieve maximum sulphurization of the metal or metals of the active phase of the catalyst.

In a third step, the catalyst is produced by bringing the sulphurized precursor from the second step into contact, at temperatures below about 500° C. and especially between about 250° C. and about 450° C. and for a time of between about 0.2 and about 3 hours and more especially between about 0.5 and about 2 hours, with an oxygen-containing gas stream consisting of an inert carrier gas containing, in terms of the volume of the inert gas, from about 0.1% to about 40% oxygen and from about 0% to about 50% water, to form the metal oxysulphide phase.

The amount of elemental sulphur used for sulphurizing the calcined impregnated support constituting the oxidized precursor of the catalyst advantageously represents a slight excess, for example, an excess ranging up to about 300 mol % with respect to the stoichiometric amount corresponding to maximum sulphurization of the metal or metals of the active phase of the catalyst. The duration of the sulphurization treatment with elemental sulphur is advantageously between about 0.5 and about 4 hours.

The gas mixture, consisting of $H_2S$ and inert gas, used as sulphurizing agent advantageously contains between 0.2% and 30% $H_2S$ by volume. The duration of the sulphurization treatment with the gas mixture containing $H_2S$ is generally between about 0.5 and about 15 hours.

According to one embodiment, and in order to form the metal oxysulphide phase, the oxygen-containing gas stream brought into contact with the sulphurized precursor of the catalyst is air. According to another embodiment, the oxygen-containing gas stream consists of an inert gas, for example, nitrogen, argon, helium or mixtures of at least two of these gases, containing, by volume of inert gas, about 0.1% to about 3%, more especially about 0.3% to about 1.5%, oxygen and about 0% to about 50%, more especially about 0.5% to about 30%, water.

The silicon carbide used for forming the support for the $H_2S$-to-sulphur oxidation catalyst may consist of any one of the known silicon carbides, as long as it has the required specific surface area characteristics, namely a specific surface area, determined by the BET nitrogen adsorption method, ranging from about 0.05 $m^2/g$ to about 600 $m^2/g$.

As examples, the silicon carbide may be prepared using any one of the techniques described in EP-A-0,313,480 (corresponding to U.S. Pat. No. 4,914,070), EP-A-0,440, 569, EP-A-0,511,919, EP-A-0,543,751, EP-A-0,543,752 and FR-A-2,758,279.

The gas containing free oxygen used for the oxidation to sulphur of the $H_2S$ contained in the gas to be treated is generally air, although it is possible to use pure oxygen, oxygen-enriched air or other mixtures which consist, in various proportions, of oxygen and of at least one inert gas and which are other than air and oxygen-enriched air.

The gas containing free oxygen and the gas to be treated containing $H_2S$ may be brought separately into contact with the oxidation catalyst. However, to obtain a very homogeneous gaseous reaction mixture during contact with the catalyst, it is preferable first to mix the gas to be treated containing $H_2S$ with the gas containing free oxygen, and to bring the mixture thus produced into contact with the oxidation catalyst.

As indicated above, the gas containing free oxygen is used in an amount suitable for providing an $O_2/H_2S$ molar ratio ranging from about 0.05 to about 15, more particularly from about 0.1 to about 10, in the reaction mixture coming into contact with the $H_2S$-to-sulphur oxidation catalyst. Advantageously, the molar ratio is between about 2.5 and about 8, thereby stabilizing the oxysulphide active phase of the catalyst.

Most particularly, the $H_2S$-to-sulphur oxidation reaction is carried out at temperatures of between about 200° C. and about 260° C. with an $O_2/H_2S$ molar ratio ranging from about 3 to about 7.

The times during which the gaseous reaction mixture is in contact with the oxidation catalyst may range from about 0.5 to about 20 seconds and preferably from about 1 to about 10 seconds, these values being given under standard pressure and temperature conditions (STP contact time).

The gas having a low $H_2S$ content, which is treated by the process according to the invention, may come from various sources. In particular, such a gas may be a natural gas having a low $H_2S$ content or an acid gas resulting from the desulphurization of a natural gas or, alternatively, a gas coming from the gasification of coal or of heavy oils, or even a gas resulting from the hydrogenation of a waste gas, for example, a waste gas from a sulphur plant, containing sulphur compounds such as $SO_2$, mercaptans, COS and $CS_2$, which can be converted into $H_2S$ by the action of hydrogen or water vapour.

The gas to be treated may also be a gas resulting from the treatment, in contact with a Claus catalyst capable of promoting the sulphur-formation reaction between $H_2S$ and $SO_2$, of a gaseous effluent containing $H_2S$ and $SO_2$ in an $H_2S/SO_2$ molar ratio of greater than 2/1, and such that the resulting gas contains above all $H_2S$ and no or very little $SO_2$ as sulphur compounds. The process according to the invention can be applied to the treatment of gas having an $H_2S$ content of less than about 25% by volume and especially between about 0.001% and about 20% by volume. In the most common cases, the content is between about 0.005% and about 10% by volume and more particularly ranges from about 0.01% to about 5% by volume. The gas to be treated may also contain organic sulphur compounds, such as mercaptans, COS and $CS_2$, in overall concentrations that may range up to approximately 1% by volume. It is possible, using the process according to the invention, to treat gases containing $H_2S$ in a concentration greater than about 25% by volume. However, in such a case, it is preferred to use the conventional sulphur-production processes comprising a thermal reaction step.

The $H_2S$-containing gas, which is oxidized in contact with the catalyst with a silicon carbide support, may be free of water or substantially free of water or, on the contrary, it may contain quite a high amount of water. Thus, it is possible according to the invention to treat an $H_2S$-containing gas which has a water content that can range from about 0% to approximately about 50%.

In the catalytic $H_2S$-to-sulphur oxidation process according to the invention, which is carried out in the vapour phase, that is to say at temperatures above the dew point of the sulphur formed during the $H_2S$ oxidation reaction, the sulphur is present in the vapour state in the reaction medium, which is in contact with the catalyst and which is collected at the outlet of the catalytic oxidation zone.

The process according to the invention may be carried out in a single oxidation zone containing the oxidation catalyst, especially when the $H_2S$ content of the gas to be treated is not greater than about 5% by volume, or else in a plurality of oxidation zones placed in series, each containing the oxidation catalyst, especially when the $H_2S$ content of the gas to be treated is greater than about 5% by volume. The single oxidation zone or each of the zones of the plurality of oxidation zones operate at temperatures lying within the intervals defined above. Each of the oxidation zones works in the temperature range corresponding to substantially optimal selectivity of the catalyst for the formation of sulphur.

Since the $H_2S$-to-sulphur oxidation is highly exothermic, it may be necessary to cool the catalyst contained in the single oxidation zone or in each of the zones of the plurality of oxidation zones, to maintain the temperature in the zone at the desired value or within the desired range corresponding to the optimum sulphur selectivity of the catalyst. It is possible, in particular, to cool the catalyst using a cold fluid, for example, water or another fluid flowing in indirect heat exchange with the catalyst, within the latter. The cooling may also be carried out by placing the catalyst in a tube reactor, consisting of one or more tubes arranged in a shell, with, for example, the catalyst being in the tube or the tubes and a cold fluid, for example, water or another fluid flowing in the shell outside the tube or tubes or vice versa.

An effluent gas laden with sulphur vapour is collected at the outlet of the single oxidation zone or of each of the zones of the plurality of oxidation zones in series, which gaseous effluent, before any subsequent $H_2S$ removal, is passed through a sulphur separation zone in which it is stripped of most of the sulphur that it contains by condensation. When the $H_2S$-containing gas is treated by passing through a plurality of oxidation zones in series, which contain the oxidation catalyst with a silicon carbide support, only a fraction of the $H_2S$ contained in the gas to be treated is oxidized to sulphur in each of the zones, by injecting into the zone in question, preferably as a mixture with the gas brought to this zone, the appropriate amount of the gas containing free oxygen to carry out this sulphur oxidation. The amount of $H_2S$ subjected to sulphur oxidation in each of the zones, which represents a fraction of the total amount of $H_2S$ in the gas to be treated, is advantageously between about 2% and about 5% by volume of the gas to be treated and the number of catalytic oxidation zones is chosen so that the gas to be treated arriving at the final catalytic zone contains at most about 5% $H_2S$ by volume.

If required, the gaseous effluent collected at the outlet of the single oxidation zone or at the outlet of the final zone of the plurality of oxidation zones in series may be subjected to an additional purification step after separating out the sulphur that it may contain, the treatment depending on the nature of the gaseous sulphur compounds remaining in the effluent.

Advantageously, the $H_2S$ oxidation catalyst used according to the invention may be formed directly, in each oxidation zone employed for the treatment of the $H_2S$-containing gas, as an operation prior to the $H_2S$ oxidation operation. To do this, an oxidized precursor of the catalyst, prepared as indicated above, is placed in each oxidation zone and, by acting directly in the oxidation zone, the oxidized precursor is subjected to a sulphurization treatment to produce a sulphurized precursor and then the sulphurized precursor undergoes an oxidizing treatment using an oxygen-containing gas stream to form the catalyst with an oxysulphide phase, the sulphurization treatment and the oxidizing treatment corresponding to the second and third catalyst preparation steps described above, respectively. The sulphurization treatment may especially be carried out using the $H_2S$-containing gas to be treated as a sulphurizing agent.

According to the invention, when the activity of the oxidation catalyst, during the $H_2S$ oxidation phase, falls below a predetermined threshold, the efficiency of the catalyst, that is to say its desulphurizing activity and its sulphur selectivity, may be restored by subjecting the deactivated catalyst to an oxidizing treatment under the conditions of the third catalyst preparation step that were described above.

The invention is illustrated by the following examples, which are given without implying any limitation.

EXAMPLE 1

Oxidation of $H_2S$ present in a gas containing, by volume, 0.5% $H_2S$, 20% $H_2O$ and 79.5% nitrogen was carried out at a temperature of 240° C., using a catalyst consisting of silicon carbide supporting an active phase comprising iron in oxysulphide form, the catalyst having a BET specific surface area of 20 m²/g and containing 5% iron by weight.

The catalyst was obtained by carrying out the following process:

In a first step, an oxidized precursor of the catalyst was prepared by first impregnating silicon carbide particles, having a mean diameter of 1 mm and having a BET specific surface area of 25 m²/g, using a suitable amount of iron nitrate, in aqueous solution, to deliver the desired amount of iron into the resulting catalyst, then by drying the impregnated product at 100° C. and calcining the dried product at 400° C. in air for 2 hours.

In a second step, a sulphurized precursor of the catalyst was formed by subjecting the oxidized precursor from step 1 to a sulphurization treatment by bringing the oxidized precursor into contact with solid sulphur, mechanically mixed with the calcined product and used in an amount representing 6.2% of the weight of the said product, which contacting treatment was carried out at a temperature of 300° C. in a helium atmosphere for 2 hours.

In a third step, the catalyst was produced by subjecting the sulphurized precursor from the second step to an oxidizing treatment by bringing the sulphurized precursor into contact, at a temperature of 300° C. and for 2 hours, with a gas stream consisting of 99.2% helium and 0.8% oxygen by volume, to form an iron oxysulphide active phase on the silicon carbide support.

The treatment of the $H_2S$-containing gas was carried out in a pilot catalytic reactor having an inlet and an outlet separated by a fixed bed of the aforementioned catalyst with a volume of 100 liters, the reactor being provided, on the one hand, with a gas feed line, connected to its inlet, and, on the other hand, with a gas discharge line, connected to its outlet. The gas feed line included a tap for injecting the gas containing free oxygen and was furthermore equipped with an indirect heat exchanger operating as a heater, mounted between the air injection tap and the inlet of the reactor. The gas discharge line was fitted with a sulphur condenser cooled by water circulation. The gases flowed from the inlet to the outlet of the reactor through the catalyst bed.

The gas to be treated, introduced via the gas feed line at a rate of 18 Sm³/h and a temperature of 40° C., received, via the tap, at a rate of 24 Sm³/h, an addition of a gas containing free oxygen and consisting of 0.8% oxygen and 99.2% nitrogen by volume, this gas containing free oxygen injected at room temperature. The mixture of the gas to be treated and the gas containing free oxygen, in which the $O_2/H_2S$ molar ratio was 2.1 (4.2 times the stoichiometric ratio for the oxidation of $H_2S$ to sulphur), was fed at a temperature of 240° C., by passing through the heater, and then injected into the reactor maintained at this temperature. The STP contact time of the mixture with the catalyst contained in the reactor was 8.6 seconds. The gaseous effluent left the reactor, via the gas discharge line, at a temperature of 240° C. and was cooled to approximately 130° C. in the condenser to separate from it the sulphur that it contained.

The degree of $H_2S$ conversion, equal to 100% during the first few hours of operation, still had a value of 96.7% after 20 hours of operation. The sulphur yield, equal to 94.5% after 1 hour of operation, still had a value of 91% after 20 hours of operation.

EXAMPLE 2

The process as described in Example 1 was carried out with, however, in the preparation of the catalyst, the oxidizing treatment on the sulphurized precursor being carried out at a temperature of 400° C. and, in the operation of oxidizing the $H_2S$ of the gas to be treated, using flow rates of the gas to be treated and of the gas containing free oxygen equal to 36 Sm³/h and 48 Sm³/h, respectively, the STP contact time, during which the mixture of the gas to be treated and the gas containing free oxygen was in contact with the catalyst contained in the reactor, then being equal to 4.3 seconds.

The degree of $H_2S$ conversion, equal to 100% during the first few hours of operation, still had a value of 95.5% after 20 hours of operation. The sulphur yield, equal to 92.5% after two hours of operation, still had a value of 91.6% after 20 hours of operation.

EXAMPLE 3

The process as described in Example 1 was carried out with, however, flow rates of the gas to be treated and of the gas containing free oxygen equal to 18 Sm³/h and 36 Sm³/h, respectively, the STP contact time during which the mixture of the gas to be treated and the gas containing free oxygen was in contact with the catalyst contained in the reactor then being equal to 6.7 seconds and the $O_2/H_2S$ molar ratio being equal to 3.2 (6.4 times the stoichiometric ratio for the oxidation of $H_2S$ sulphur).

The conversion of the $H_2S$ was virtually total up to approximately 50 hours of operation, and then decreased slightly, stabilizing to a value of 98% after 70 hours of operation, this value still being observed after 100 hours of operation. Likewise, the sulphur yield, equal to 95.6% after 60 hours of operation, decreased slightly and then reached 94.5% after 75 hours of operation and 93.7% after 100 hours of operation.

EXAMPLE 4

Using a device similar to that employed in Example 1, oxidation of $H_2S$ present in a gas containing 4% $H_2S$, 15% $H_2O$ and 81% nitrogen by volume was carried out at a temperature of 240° C., using a catalyst consisting of silicon carbide supporting an active phase comprising iron in the oxysulphide form. The catalyst was present in the form of granules having a diameter of 1 mm and a length of 5 mm, and a BET specific surface area of 30 m²/g, and it contained 5% iron by weight.

The catalyst was obtained by carrying out the following operation:

In a first step, an oxidized precursor of the catalyst was prepared by first impregnating silicon carbide granules, having a mean diameter of 1 mm and a length of 5 mm and having a BET specific surface area of 40 m²/g, using a suitable amount of iron nitrate, in aqueous solution, to deliver the desired amount of iron into the resulting catalyst, then by drying the impregnated product at 100° C. and calcining the dried product at 400° C. in air for 2 hours.

In a second step, a sulphurized precursor of the catalyst was formed by subjecting the oxidized precursor from the first step to a sulphurization treatment by bringing the oxidized precursor into contact jointly with solid sulphur, mechanically mixed with the calcined product and used in an amount representing 6.2% by weight of the said product, and with a stream of $H_2S$-containing gas having the composition of the gas to be treated, which contacting treatment was carried out at a temperature of 300° C. for 3 hours.

In a third step, the catalyst was produced by subjecting the sulphurized precursor from the second step to an oxidizing treatment by bringing the sulphurized precursor into contact, at a temperature of 400° C. and for 2 hours, with an oxygen-containing gas stream consisting of air, to form an iron oxysulphide active phase on the silicon carbide support.

The gas to be treated, introduced via the gas feed line at a rate of 42 Sm³/h and at a temperature of 40° C., received via the tap, at a rate of 42 Sm³/h, an addition of air as gas containing free oxygen, this air being injected at room temperature. The mixture of gas to be treated and air, in which the $O_2/H_2S$ molar ratio was equal to 5 (10 times the stoichiometric ratio for the oxidation of $H_2S$ to sulphur), was fed at a temperature of 240° C., by passing it through the heater, and then injected into the reactor maintained at this temperature. The STP contact time during which the mixture was in contact with the catalyst contained in the reactor was equal to 4.3 seconds. The gaseous effluent left the reactor, via the gas discharge line, at a temperature of 240° C. and was cooled to approximately 130° C. in the condenser to separate from it the sulphur that it contained.

The degree of $H_2S$ conversion, equal to 100% during the first few hours of operation, still had a value of 99% after 15 hours of operation. The sulphur yield, equal to 94% at the start of the operation, still had a value of 90% after 15 hours of operation.

EXAMPLE 5

Using a device similar to that employed in Example 1, oxidation of $H_2S$ present in a gas containing 1.7% $H_2S$, 18% $H_2O$ and 80.3% nitrogen by volume was carried out at a temperature of 210° C. using a catalyst consisting of silicon carbide supporting an active phase comprising iron in the oxysulphide form. The catalyst was present in the form of granules having a diameter of 1 mm and a length of 5 mm and a BET specific surface area of 1 m²/g, and it contained 5% iron by weight.

The catalyst was obtained as described in Example 4 with, however, the use of a silicon carbide support having a specific surface area equal to 2 m²/g and by carrying out the sulphurization step for a time of 5 hours and carrying out the third step at a temperature of 450° C.

The gas to be treated, introduced via the gas feed line at a rate of 60 Sm³/h and a temperature of 40° C., received via the tap, at a rate of 30 Sm³/h, an addition of air as gas containing free oxygen, this air being injected at room temperature. The mixture of gas to be treated and air, in which the $O_2/H_2S$ molar ratio was equal to 6 (12 times the stoichiometric ratio for the oxidation of $H_2S$ to sulphur), was fed at a temperature of 210° C., by passing it through the heater, and then injected into the reactor maintained at this temperature. The STP contact time during which the mixture was in contact with the catalyst contained in the reactor was equal to 4 seconds. The gaseous effluent left the reactor, via the gas discharge line, at a temperature of 210° C. and was cooled to approximately 130° C. in the condenser to separate from it the sulphur that it contained.

The degree of $H_2S$ conversion, equal to 100% after two hours of operation, still had a value of 98% after 13 hours of operation. The sulphur yield stabilized to a value of 94% after two hours of operation and still retained this value after 13 hours of operation.

What is claimed is:

1. A process for catalytically oxidizing $H_2S$ contained in a gas to sulphur comprising:

combining the $H_2S$-containing gas with a gas containing free oxygen in an amount to produce an oxygen-enriched $H_2S$-containing gas having a $O_2/H_2S$ molar ratio ranging from about 0.05 to about 15; and contacting the oxygen-enriched $H_2S$-containing gas with a catalyst for selective oxidation of $H_2S$ to sulphur, wherein the catalyst comprises a catalytically active phase combined with a silicon carbide-based support and wherein the active phase of the catalyst consists of at least one oxysulphide of at least one metal selected from the group consisting of iron, copper, nickel, cobalt, chromium, molybdenum and tungsten, at a temperature above the dew point of sulphur formed during $H_2S$ oxidation.

2. The process according to claim 1, wherein said metal is iron or a mixture of iron and of at least one of copper, nickel, cobalt, chromium, molybdenum and tungsten.

3. The process according to claim 1, wherein the $H_2S$-to-sulphur oxidation reaction is carried out at temperatures above about 180° C. but not exceeding about 500° C.

4. The process according to claim 1, wherein the $H_2S$-to-sulphur oxidation reaction is carried out at temperatures of between about 190° C. and about 300° C.

5. The process according to claim 1, wherein the $H_2S$-to-sulphur oxidation reaction is carried out at temperatures of between about 200° C. and about 260° C.

6. The process according to claim 1, wherein the silicon carbide support is at least about 40% by weight of the catalyst.

7. The process according to claim 1, wherein the silicon carbide support is at least about 50% by weight of the catalyst.

8. The process according to claim 1, wherein the active phase of the oxidation catalyst, measured by weight of metal, represents from about 0.1% to about 20%, of the weight of the catalyst.

9. The process according to claim 1, wherein the active phase of the oxidation catalyst, measured by weight of metal, represents from about 0.2% to about 15%, of the weight of the catalyst.

10. The process according to claim 1, wherein the active phase of the oxidation catalyst, measured by weight of metal, represents from about 0.2% to about 7%, of the weight of the catalyst.

11. The process according to claim 1, wherein the specific surface area of the catalyst, determined by the BET nitrogen adsorption method, ranges from about 0.05 m²/g to about 600 m²/g.

12. The process according to claim 1, wherein the specific surface area of the catalyst, determined by the BET nitrogen adsorption method, ranges from about 0.1 m²/g to about 400 m²/g.

13. The process according to claim 1, wherein the gas containing free oxygen is supplied in an amount effective to produce an $O_2/H_2S$ molar ratio ranging from about 0.1 to about 10.

14. The process according to claim 1, wherein the gas containing free oxygen is supplied in an amount effective to produce an $O_2/H_2S$ molar ratio ranging from about 2.5 to about 8.

15. The process according to claim 13, wherein the $H_2S$-to-sulphur oxidation reaction is carried out at temperatures of between about 200° C. and about 260° C. with an $O_2/H_2S$ molar ratio ranging from about 3 to about 7.

16. The process according to claim 1, wherein the contact times during which the gaseous reaction mixture is in contact with the oxidation catalyst, under standard temperature and pressure conditions, range from about 0.5 to about 20 seconds.

17. The process according to claim 1, wherein the contact times during which the gaseous reaction mixture is in contract with the oxidation catalyst, under standard temperature and pressure conditions, range from about 1 to about 10 seconds.

18. The process according to claim 1, wherein the $H_2S$ content of the gas to be treated is between about 0.001% and about 20% by volume.

19. The process according to claim 1, wherein the $H_2S$ content of the gas to be treated is between about 0.005% and about 10% by volume.

20. The process according to claim 1, wherein the $H_2S$ content of the gas to be treated is between about 0.01% and about 5% by volume.

21. The process according to claim 1, wherein the oxidation catalyst is obtained by carrying out a process comprising:
   a) preparing an oxidized precursor of the catalyst by impregnating a silicon carbide support with a solution or a sol of the metal or metals desired for the active phase, in the form of salts, drying the support thus impregnated and calcining the dried product at temperatures ranging from about 250° C. to about 500° C., which calcining may or may not be carried out in an inert atmosphere;
   b) forming a sulphurized precursor of the catalyst by subjecting the oxidized precursor to a sulphurization treatment by contact with a sulphurizing agent consisting of elemental sulphur and/or of a gas mixture consisting of $H_2S$ and of an inert gas, which treatment is carried out at temperatures of between about 250° C. and about 500° C. and for a time long enough to achieve a desired level of sulphurization of the metal or metals of the active phase of the catalyst; and
   c) producing the catalyst by bringing the sulphurized precursor into contact, at temperatures below about 500° C. for a time of between about 0.2 and about 3 hours, with an oxygen-containing gas stream consisting of an inert carrier gas containing, in terms of the volume of the inert gas, from about 0.1% to about 40% oxygen and from about 0% to about 50% water by volume, to form the metal oxysulphide phase.

22. The process according to claim 21, wherein the $H_2S$-to-sulphur oxidation is carried out in one or more reaction zones and the $H_2S$ oxidation catalyst is formed directly, in each reaction zone, as a step prior to the $H_2S$ oxidation step, by placing in each reaction zone an oxidized precursor of the catalyst, obtained in step a), then, by a direct operation in the reaction zone, subjecting the oxidized precursor to a sulphurization treatment to produce a sulphurized precursor and then carrying out an oxidizing treatment on the sulphurized precursor using an oxygen-containing gas stream to form the catalyst with an oxysulphide phase, the sulphurization treatment and the oxidizing treatment being carried out in steps b) and c), respectively.

23. The process according to claim 1, wherein, when the activity of the oxidation catalyst, during the $H_2S$ oxidation phase, falls below a predetermined threshold, the efficiency of the catalyst is restored by subjecting the deactivated catalyst to an oxidizing treatment by contacting the deactivated catalyst, at a temperature below about 500° C. and for a duration of between about 0.2 and about 3 hours, with an oxygen-containing gas stream including an inert carrier gas containing, by volume of the said inert gas, from about 0.1% to about 40% oxygen and from about 0% to about 50% water to form the metal oxysulphide phase.

* * * * *